US007006683B2

(12) United States Patent
Brand

(10) Patent No.: US 7,006,683 B2
(45) Date of Patent: Feb. 28, 2006

(54) MODELING SHAPE, MOTION, AND FLEXION OF NON-RIGID 3D OBJECTS IN A SEQUENCE OF IMAGES

(75) Inventor: Matthew Brand, Newton, MA (US)

(73) Assignee: Mitsubishi Electric Research Labs., Inc., Cambridge, MA (US)

( * ) Notice: Subject to any disclaimer, the term of this patent is extended or adjusted under 35 U.S.C. 154(b) by 1053 days.

(21) Appl. No.: 09/791,117

(22) Filed: Feb. 22, 2001

(65) Prior Publication Data

US 2003/0072482 A1    Apr. 17, 2003

(51) Int. Cl.
   *G06K 9/00*    (2006.01)
(52) U.S. Cl. ..................... 382/154; 382/195; 382/274; 345/419
(58) Field of Classification Search ................ 387/103, 387/154, 107, 236, 199, 276, 291, 284, 181, 387/190, 195, 232, 285, 224; 348/169; 345/419, 345/418, 420, 473, 423, 474; 382/195, 274
See application file for complete search history.

(56) References Cited

U.S. PATENT DOCUMENTS

| | | | | |
|---|---|---|---|---|
| 5,802,220 | A | | 9/1998 | Black et al. ................ 382/276 |
| 6,047,078 | A | * | 4/2000 | Kang ......................... 382/107 |
| 6,049,619 | A | | 4/2000 | Anandan et al. ............ 382/107 |
| 6,115,052 | A | | 9/2000 | Freeman et al. ............ 345/473 |
| 6,124,864 | A | * | 9/2000 | Madden et al. ............. 345/473 |
| 6,204,860 | B1 | * | 3/2001 | Singh ......................... 345/420 |
| 6,492,986 | B1 | * | 12/2002 | Metaxas et al. ............ 345/420 |
| 6,504,546 | B1 | * | 1/2003 | Cosatto et al. .............. 345/473 |
| 6,556,196 | B1 | * | 4/2003 | Blanz et al. ................ 345/419 |
| 6,760,488 | B1 | * | 7/2004 | Moura et al. ............... 382/285 |

OTHER PUBLICATIONS

Tan Joo Kooi, Ishikawa Seiji "On Modelling Three Dimensional Objects by Uncalibrated Cameras". IEEE 2000, pp. I-59 to I-63).*

Barron et al., "The Feasibility of Motion and Structure from Noisy Time-Varying Image Velocity Information"; International Journal of Computer Vision, 5:3, pp. 239-269, 1990.

Heyden et al., "An Iterative Factorization Method for Projective Structure and Motion from Image Sequences"; Image and Vision Computing 17, pp. 981-991, 1999.

Stein et al., "Model-Based Brightness Constraints: On Direct Estimation of Structure and Motion"; IEEE Transactions on Pattern Analysis and Machine Intelligence, vol. 22, No. 9, pp. 992-1015, Sep. 2000.

(Continued)

*Primary Examiner*—Bhavesh M. Mehta
*Assistant Examiner*—Sheela Chawan
(74) *Attorney, Agent, or Firm*—Dirk Brinkman; Andrew J. Curtin

(57) ABSTRACT

A method models a non-rigid three-dimensional object directly from a sequence of images. A shape of the object is represented as a matrix of 3D points, and a basis of possible deformations of the object is represented as a matrix of displacements of the 3D points. The matrices of 3D points and displacements forming a model of the object. Evidence for an optical flow is determined from image intensities in a local region near each 3D point. The evidence is factored into 3D rotation, translation, and deformation coefficients of the model to track the object in the video.

8 Claims, 6 Drawing Sheets

OTHER PUBLICATIONS

Sugihara et al., "Recovery of Rigid Structure from Orthographically Projected Optical Flow"; Computer Vision, Graphics and Image Processing 27, pp. 309-320, 1984.

Waxman et al., "Surface Structure and Three-Dimensional Motion from Image Flow Kinematics"; The International Journal of Roborics Research, 4(3), pp. 72-94, 1985.

* cited by examiner $$\text{Pose} = \bigcirc\!\!\!\nearrow \times \left(\begin{smallmatrix}\circ\,\cdot\\\circ\end{smallmatrix}\right) + \left(\begin{smallmatrix}\ominus & \ominus & \ominus\\ \blacksquare & \blacksquare & \blacksquare\end{smallmatrix}\right) + \nearrow$$

Pose ~ 200, 201, 202, 203-205, 207, 206

$$P = R \times B + \left(C \otimes I\right)D + T$$

$$P_I - P_J = vec(R(B + (C \otimes I)D\_\bar{B})^T = F = Y'/X$$

FIG. 4

501 ∼ $\hat{T} \longrightarrow vec(Y/X) \, 1/n$

502 ∼ $\hat{C} \longrightarrow (vec\,\hat{R} \setminus G)$

503 ∼ $\hat{R} \longrightarrow \sqrt{QQ^T} \setminus Q$

504 ∼ $/Q \doteq vec(GC^{\pm}); \; G \doteq vec(C^I \otimes R); \; C^{\pm} \doteq sgn(G_{k+1} \setminus G_k)^T$

FIG. 5

MODELING SHAPE, MOTION, AND FLEXION OF NON-RIGID 3D OBJECTS IN A SEQUENCE OF IMAGES

FIELD OF THE INVENTION

The present invention relates generally to computer vision, and more particularly to a method for modeling shape, motion, and flexion of deformable objects in a sequence of images

BACKGROUND OF THE INVENTION

The relation between point correspondences in an optical flow to a shape of a three-dimensional (3D) rigid-body for the purpose of modeling has been extensively described, see, for example, Barron et al., "*The feasibility of motion and structure from noisy time-varying image velocity information,*" IJCV, 5(3):239–270, December 1990, Heyden et al., "*An iterative factorization method for projective structure and motion from image sequences,*" IVC, 17(13):981–991, November 1999, Stein et al., "*Model-based brightness constraints: On direct estimation of structure and motion,*" PAMI, 22(9):992–1015, September 2000, Sugihara et al., "*Recovery of rigid structure from orthographically projected optical flow,*" CVGIP, 27(3):309–320, September 1984, and Waxman et al., "*Surface structure and three-dimensional motion from image flow kinematics,*" IJRR, 4(3):72–94, 1985.

Most modern methods for extracting 3D information from image sequences (e.g., a video) are based on the Tomasi & Kanade "rank theorem" as described by Tomasi et al. in "*Shape and motion from image streams under orthography: A factorization method,*" International Journal of Computer Vision, 9(2):137–154, 1992. Matrices used for orthographically projected rigid-body motion have rank-3. That is, the matrices can be expressed as three linearly independent vectors. It is well known that the matrices can be factored into shape and projection via a thin single value decomposition (SVD). Bregler et al. in "*Recovering non-rigid 3D shape from image streams,*" Proc. CVPR, 2000, describe an extension to k-mode non-rigid motion via rank-3k double-SVD. To date, all such factorization methods require successful point tracking data as input.

Non-rigid two-dimensional (2D) modeling methods for object matching or tracking are also known. These are either based on eigenspace representations of variability of shape, see Black and Yacoob, "*Eigentracking: Robust matching and tracking of articulated objects using a view-based representation,*" IJCV, pages 63–84, 1998, Cootes et al., "*Active appearance models,*" Proc. ECCV, volume 2, pages 484–498, 1998, and Covell, "*Eigen-points: Control-point location using principal component analysis,*" Proc. 2nd IWAFGR, 1996, or parametric representations of variability, see Black and Jepson "*Tracking and recognizing rigid and non-rigid facial motions using local parametric models of image motion,*" Proc. ICCV, 1995, and Sclaroff et al., "*Active blobs,*" Proc. ICCV, 1998.

Most of these methods require a large number of hand-marked images for training the model. Covell's eigenpoint tracker employs an eigen-basis to relate affine-warped images of individual facial features to hand-marked fiduciary points on those features. Black and Yacoob described parametric 2D models of flow for non-rigid facial features, and Black and Jepson also use an eigen-basis of views for 2D tracking of non-rigid objects. Cootes et al. employ statistical models of 2D shape to handle variation in facial images due to pose and identity, but not expression. Many of these approaches require robustizing methods to discard outliers. Clearly, there is a price to pay for using 2D models of what is essentially 3D variability.

Bascle et al. in "*Separability of pose and expression in facial tracking and animation,*" Proc. ICCV, 1998, describe an interesting compromise between 2D and 3D tracking by factoring the motion of tracked contours into flexion and 2D affine-with-parallax warps via SVD.

None of the prior art addresses the full problem of tracking a non-rigid 3D object in video and recovering its 3D motion and flexion parameters, nor recovering such parameters directly from variations in pixel intensities. It is desired to provide an improved method for acquiring models and their motions from a sequence of images. The method determines 3D motion and flexion directly from intensities in the images without losing information while determining intermediate results. The method should minimize uncertainty, and prior probabilities should give confidence measures.

SUMMARY THE INVENTION

The invention provides non-rigid 3D model-based flow and model acquisition from a sequence of images in the context of linear deformable models and scaled orthography. The method according to the invention obtains maximum likelihood and maximum posterior 3D motion and flexion estimators that operate directly on image intensity gradients. The method minimizes information loss in matrix operations and manipulates the error norms of least-squares operations so that calculations are most influenced by evidence from the most informative parts of each image. The invention also provides model refinement for increasing the detail and accuracy of models, allowing very detailed models to be refined from very generic models. Due to the minimized information loss, all the described determinations are fast, accurate, and robust in the face of noise and other degradations.

More specifically, the invention provides method that models a non-rigid three-dimensional object directly from a sequence of images. A shape of the object is represented as a matrix of 3D points, and a basis of possible deformations of the object is represented as a matrix of displacements of the 3D points. The matrices of 3D points and displacements forming a model of the object. Evidence for an optical flow is determined from image intensities in a local region near each 3D point. The evidence is factored into 3D rotation, translation, and deformation coefficients of the model to track the object in the video.

BRIEF DESCRIPTION OF THE DRAWINGS

FIG. 2 is a diagram of the projection which models the flexion and posing of the object;

FIG. 4 is a diagram of optical flow equated with model flexion and posing;

FIG. 5 is a diagram of solutions for various model variables; and

DETAILED DESCRIPTION OF THE PREFERRED EMBODIMENTS

Introduction

The invention provides a linear, model-based object tracking method. The method tracks a non-rigid, three-dimensional (3D) object in a sequence of images. The image sequence can be composed of 2D data, e.g. a video, or 3D volumetric data, e.g., a time-series of volume data sets. The method determines 3D motion and flexion, i.e., deformation coefficients, directly from intensity values in the images without information-lossy intermediate results. A Bayesian framework manages uncertainty, and accommodates prior probabilities to give confidence measures.

The invention provides accurate and robust closed-form motion estimators by minimizing information loss from non-reversible matrix operations such as divisions, inner products and least-squares calculations such as divisions. These matrix operations are either eliminated, or else, where unavoidable, delayed as long as possible and then performed with appropriate error norms. For model acquisition, the method according to the invention refines a generic model to fit a non-rigid 3D object in the sequence of images. As an advantage, the described method for model acquisition, model tracking, and model refinement can be applied to a low-quality, low-resolution sequence of images.

Overview

Knowledge of 3D shape and deformation of a non-rigid 3D object is a valuable constraint in tracking the object in a sequence of images. A sequence of images of modest number should contain sufficient information to recover such a model. Herein, the tracking and refinement of a model of a non-rigid 3D object, observed in a low-resolution sequence of images, is described in the context of a scaled orthographic camera.

Model-Based Optical Flow

Figure 1:
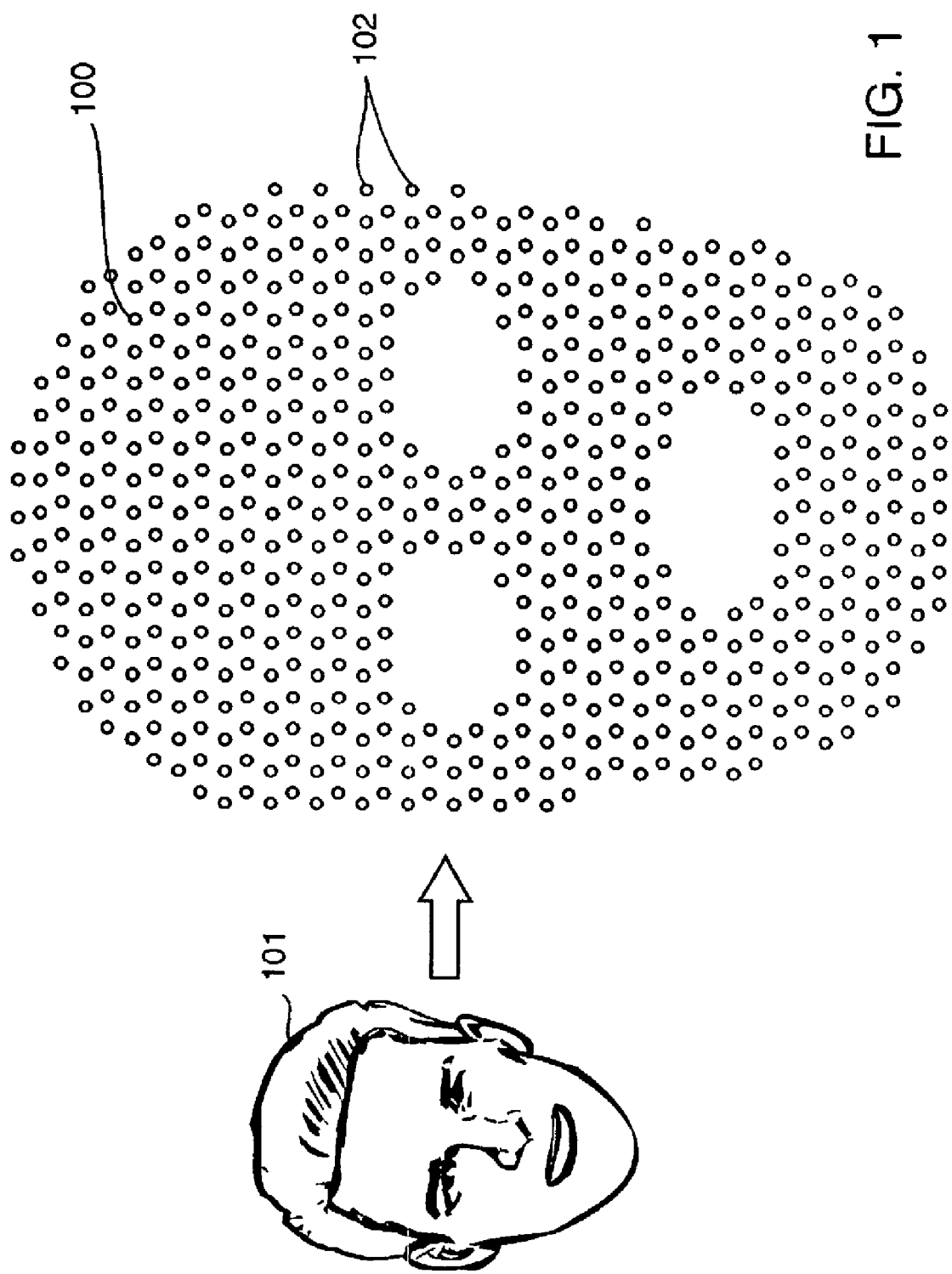
FIG. 1 is a diagram of an object modeled by a matrix of 3D points that can be displaced for changes in shape and pose of the model.
Figure 6:
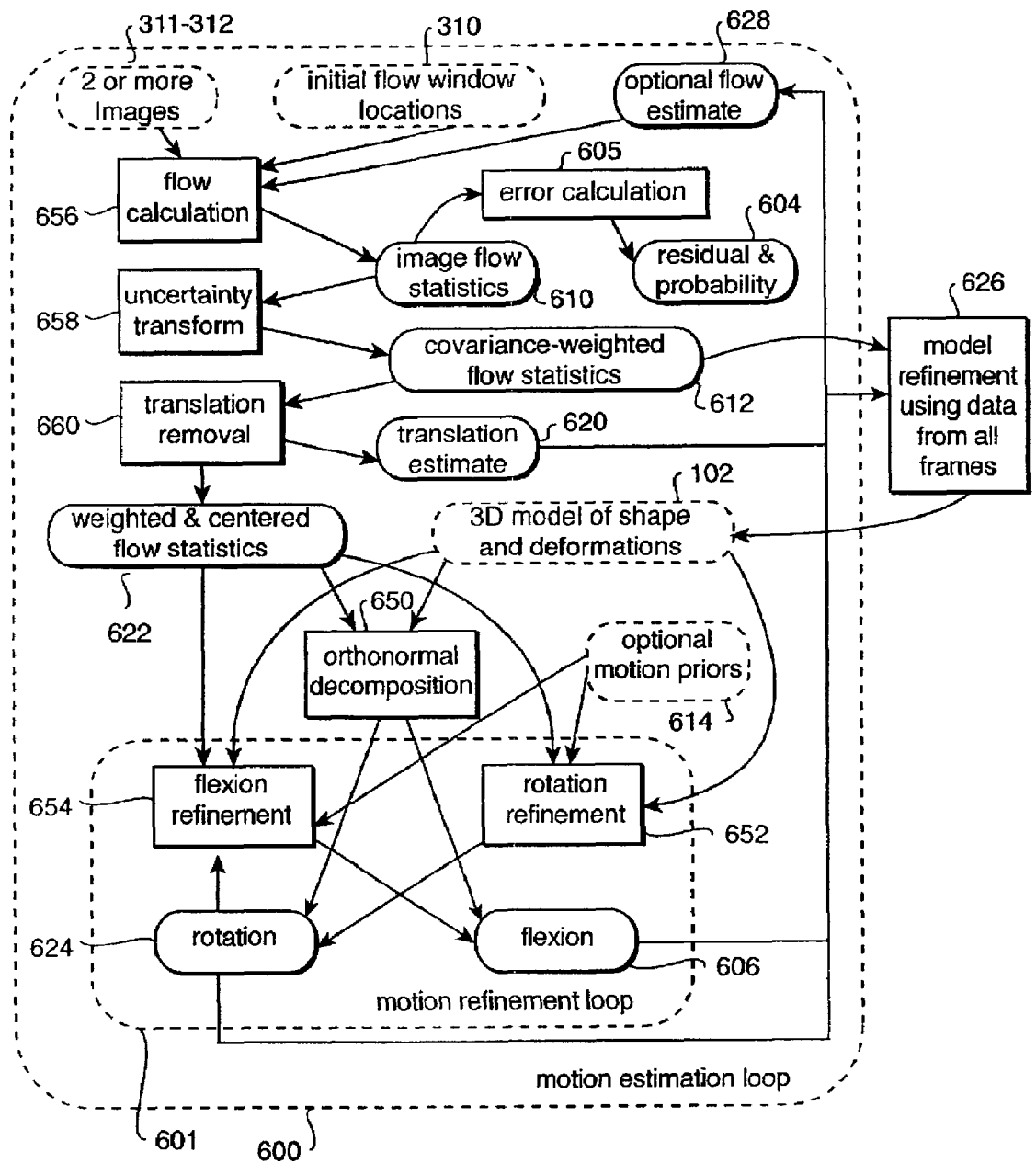
FIG. 6 is a flow diagram of data information flow and processes according to the invention.

As shown in FIGS. 1, 2 and 6, the invention provides a linear method for determining 3D flex-constrained optical flow in a sequence of 2D or 3D images. FIG. 1 shows the basic "cloud-of-points" 102 model 100, FIG. 2 shows the projection 200 of the model 100, and FIG. 6 shows the motion estimation 600 and refinement 601 steps of the model. The present method enables real-time monocular 3D tracking and model refinement. The model of the non-rigid 3D object, e.g., a face, is expressed in the form of the 3D cloud-of-points 100 describing the average 3D shape 202 and its modes of deformation 203–205. A deformation 203–205 defines a unique 3D displacement for each point. A flexion 207, determined by step 606 of the motion refinement loop 601, describes the amplitude of a deformation. For example, there may be a deformation that moves the lips of the face model. That deformation may be flexed positively or negatively to open or close the mouth. A wide variety of shape changes can be modeled by combining several deformations, each flexed a different amount.

The described method solves directly for the object's translation 206, rotation 201, and flexion 207 in each image. The flexion also caries scale information as described below. It also gives a confidence measure in the form of a posterior probability 604. Maximum likelihood and Bayesian maximum a posterior (MAP) motion (652) and flexion (654) are determined directly from intensity gradients without information-lossy intermediate results, i.e., without estimating the optical flow. In other words, the preferred method uses actual optical flow evidence, and not optical flow estimates. The method also accommodates motion prior probabilities (priors) 614, and can exploit multi-image and multi-view constraints.

Maximizing Information State

The invention uses matrix transforms to maximize an information state in calculations. It is well known that non-reversible matrix operations, such as multiplication, division, and thin SVD, reduce the information state and consequently increase errors. For example, a multiplication's inner product reduces information state because two vectors are reduced to a single value. If the vectors represent measurements with some associated uncertainty, a conventional inner product can actually yield the wrong value. Division and SVD are particularly troublesome because results obtained by these matrix operations are correct only in a least-squares sense. This implies a spherical error norm, which is known to be the wrong error norm for many computer vision problems.

Therefore, the invention arranges sequences of matrix operations so that the information state increases rather than decreases. This is done principally by a judicious substitution of reversible analogues, for example, substituting Kronecker products for matrix multiplications, thereby eliminating inner products. This enables the invention to eliminate, or at least maximally delay, least-squares operations until the information state must finally be reduced to give the shape, motion, and flexion. To do this, several useful identities are described below. These entities enable the present method to factor information out of expanded arrays under arbitrary elliptical (Mahalonobis) error norms.

Robust Tracking Without Features

"Image uncertainty" refers to uncertainty about the exact value of a measurement, for example, the location of a "landmark" in an image. Sources of uncertainty are blur, sensor noise, and the limited dynamic range and sampling rate of the imaging sensor. When quantifiable, image uncertainty can carry as much information as the measurement itself. While tracking the non-rigid 3D objects in the sequence of video images, the method of the invention propagates image uncertainties back through the projection model until the uncertainties can be resolved via interaction with global geometric invariants. The resulting tracker uses whatever information is available in an arbitrary sampling of image regions and gives accurate motion, even when most of these regions are low quality, e.g., textureless, or self-occluded.

Acquiring Model Geometry

The described method also provides a novel solution for estimating the 3D linearly deformable model for the non-rigid object in the sequence of images. Model refinement 626 combines a poorly fit model with its tracking residuals to yield a more accurate model with increased detail, i.e., increasing the number of "points" in the "cloud."

Outline

To start, an object tracker applies a geometry-based model for 3D motion and flexion to an intensity-based description of 2D optical flow in the sequence of images. The optical flow is eliminated, and motion parameters are derived directly from the optical flow intensities. All determinations are made in sub-spaces of the 3D motion and flexion yielding a robust 3D tracker. Image uncertainty information is propagated throughout the determinations. This increases accuracy and naturally leads to a Bayesian formulation. Finally, a solution for the geometry of the model is described.

The following notations for matrix operations are used in this description, see, Golub et al., "*Matrix Computations,*" Johns Hopkins U. Press, 1996, and Magnus et al., "*Matrix differential calculus with applications in statistics and econometrics,*" Wiley, 1999.

| Symbol | Meaning |
|---|---|
| $\otimes$ | Kronecker Product |
| $\odot$ | Hadamard Product |
| $\oplus$ | Tiled Addition |
| trA | Trace |
| A† | Pseudoinverse |
| $A^T$ | Vector-Transpose |

Flex and Flow

Object Flex

As shown in FIGS. 1 and 2, the invention expresses the base shape 202 of the model 100 of the non-rigid 3D object 101 in a sequence of images by a matrix of 3D points 102. The example object modeled is a face. It should be noted that the clouds of points can be located in three-dimensions.

As shown in FIG. 2, the shape and motion, i.e., the projection or pose P 200, of the model 100 onto each image of the sequence of images can be expressed by $$P = R_{d \times 3}(B_{3 \times n} + (C_{1 \times k} \otimes I_3)D_{3k \times n}) \oplus T_{2 \times l}, \quad (1)$$

where R 201 is an orthographic projective rotation matrix, d the number of dimensions, B 202 is the matrix of the 3D points 102, C 207 is a vector of the flexion, i.e., deformation coefficients, I is the identity matrix, D 205 is a vector of k linearly separable deformations of the model, and T 206 is a 2D translation matrix. The deformations 203–205 are weighted by the flexion coefficients 207. If the rotation matrix R drops the depth dimension, then the projection is orthographic, and if the basis set of deformations includes the base shape, then the orthographic projection is scaled.

Optical Flow

Figure 3:
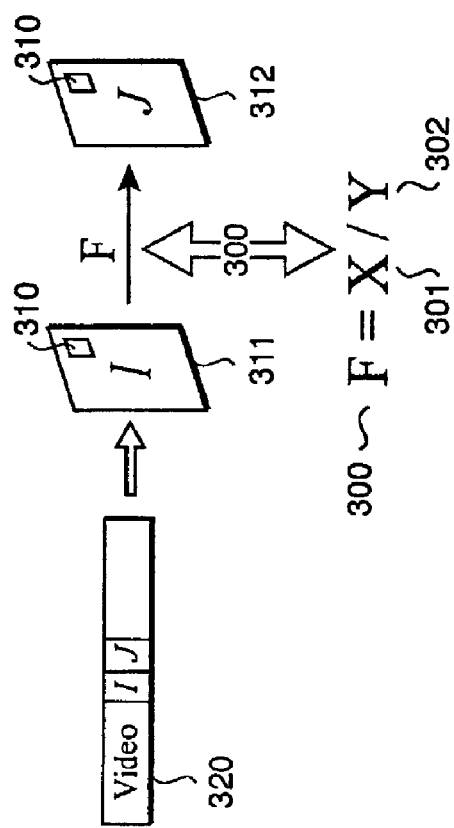
FIG. 3 is a diagram of optical flow in a sequence of images in terms of optical flow intensities.

As stated above, the motion and flexion are determined from intensity gradients in the images. As shown in FIG. 3, the 2D or 3D optical flow evidence ($\vec{F} \leftarrow Y/X$) 300 of a small local region (r) 310 of the object in two consecutive images I 311 and J 312 of the sequence of images 320, can be determined (flow calculation) 656, to a first-order, by image intensity values that consider:

spatial variation $X \doteq \int_R g(x)^T g(x) d(x))$ 301;

temporal variation $Y \doteq \int_R [I(x) - J(x)]g(x)d(x)$ 302, and spatial gradients $g(x) = [\partial_x(I+J), \partial_y(I+J)]$ 303 of the intensities in the images I and J, see Lucas et al. "*An Iterative Image Registration Technique with an Application to Stereo Vision,*" International Joint Conference on Artificial Intelligence, pages 674–679, 1981. Multiple (n) regions r 310 can be concurrently tracked by extending the vectors F and Y, and diagonally stacking the matrix X.

However, it is well known that the optical flow 300 in the small local regions r 310 is an unreliable indicator of actual physical motion without some global constraints to make the n concurrent estimations mutually dependent.

Motion Estimation

Figure 4:
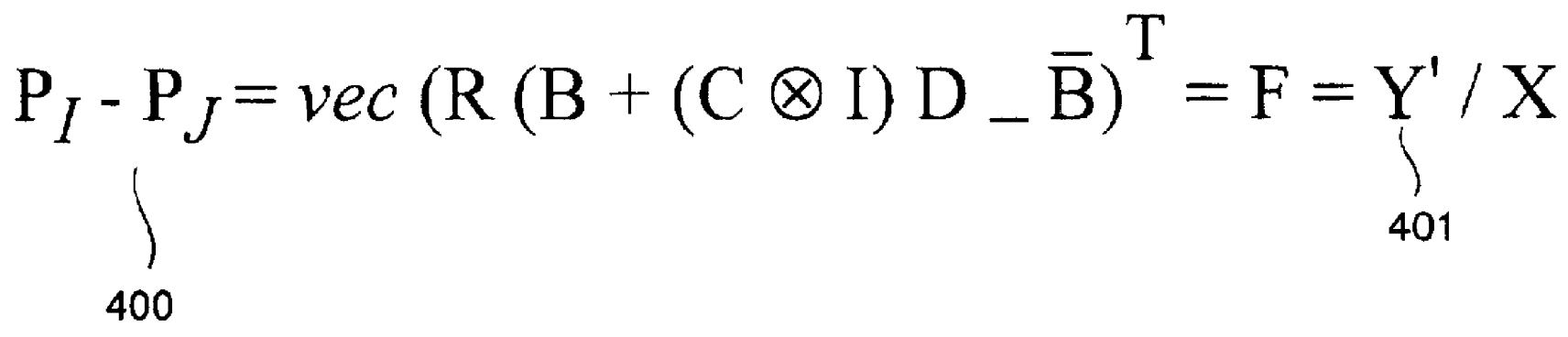

Therefore, as shown in FIG. 4, the method according to the invention constrains 400 the optical flow from image I to J to lie in the sub-space of allowable deformations and 3D motion. Without loss of generality, the shape and deformations can be made zero-mean so that the mean motion of all points 102 of the model 100 gives the 2D or 3D displacement of the shape of the object 101. This allows the method to determine 620 the translation T 206. Translation is then be removed 660 by shifting the two consecutive images I and J into alignment. A new temporal variation Y' 401 can be determined 622 from the aligned regions of the two images 311–312.

If matrix B 202 of points 102 represents the base shape of the object 101 in the image I 311, the matrix D 205 the deformations, the matrix C 207 the unknown flexion (deformations coefficients) from image I to image J, and the matrix O the 2D orthographic projector—so that $\bar{B} \doteq OB$, then the optical flow F 300 can also be expressed as:

$$\mathrm{vec}(R(B + (C \otimes I_3)D) - \bar{B})^T = F = Y'/X = P_I - P_J 400, \quad (2)$$

that is, the difference between the projections in the consecutive images 311–312.

Equation (2) can be rewritten in simplified form as $$\mathrm{vec}(R(C' \otimes I_3)D')^T X = (Y' + (\mathrm{vec}\bar{B})^T X). \quad (3)$$

The use of vec and $\otimes$ allows the left-hand side of the equation to be expressed in product form, which enables solving for any one of the unknowns with a single division.

As shown in FIG. 5, the method according to the invention solves for various variables (T, C, R) 501–503 that are used to model shape, motion, and flexion of the non-rigid object 101 in the sequence of images 320, alone and in various combinations. As an advantage, the invention uses a minimum number of inner product and least-square operations to maximize an information state, and minimize an uncertainty (error norm Q 504) as described in greater detail below.

Naive Solution

First the rotation and the flexion are isolated by:

$$(C' \otimes R)_{2 \times 3(k+1)} = \underset{2 \times n}{\mathrm{vec}}((Y' + (\mathrm{vec}\bar{B})^T X)/X)/D' \quad (4)$$

$$= (\underset{2 \times n}{\mathrm{vec}}(Y'/X) + \bar{B})/D'$$

As stated above, it is desired to reduce the number of the divisions. The minimization of divisions is described below. To extract the rotation and the flexion, the left-hand side of equation (4) is arranged to form a rank-1 matrix $$M_{6 \times (k+1)} \doteq ((C' \otimes R)^T)^{(3)} = [R_{xx}, R_{xy}, R_{xz}, R_{yx}, R_{yy}, R_{yz}]^T C'$$

If the matrix M is noiseless, the value $\mathrm{vec}\hat{R}^T$ is the first column of matrix M, and $\hat{C} \leftarrow (\mathrm{vec}\hat{R}) \backslash M$.

Orthonormal Decomposition

A noisy matrix can be factored as follows. The factorization of $(\mathrm{vec}\hat{R}^T)\hat{C}' \leftarrow M$, i.e., the vectorized orthonormal matrix times the deformation coefficient matrix, is usually performed by a thin $$SVD\ USV^T \xleftarrow{SVD_1} M$$

followed by orthonormalization of $(vec_3 U)^T$ to yield $\hat{R}$, then corrective redivision $\hat{C}' \leftarrow (vec\hat{R}^T)\backslash M$. This finds the rotation closest to the vector that best divides M, which is generally not the best rotation available from M. Because M is small, the SVD may incorporate noise rather than suppress it, especially noise that is not independent and identically distributed (i.i.d.) Gaussian random variables.

Instead, the preferred method uses an orthonormal decomposition 650 that directly recovers the rotation R 201 more accurately and econonically than standard SVD-based methods. Geometrically, matrix R is the rotation that brings the axes in $O^T$, scaled by $\hat{C}'$, into alignment with the columns of the top and bottom halves ($M^\uparrow$, $M^\downarrow$) of matrix M.

This can be expressed as an absolute orientation, see Horn et al., "*Closed form solution of absolute orientation using orthonormal matrices*," J. of the Optical Society A, 5(7): 1127–1135, 1988.

Let $A \doteq (O_{\otimes}{}^{'T})[M^\uparrow, M^\downarrow] = vec_3(M\hat{C}'^T)$. Then, $\hat{R} \leftarrow (A/\sqrt{A^T A})^T = V\Lambda^{-1/2} V^T A^T$, using the 2D eigen-decomposition $V\Lambda V^T = A^T A$. Thus, the $O(k^3)$ SVD is replaced with an $O(1)$ eigenproblem.

This requires an initial determination of the deformation coefficients, e.g., $C' \leftarrow (sgn(M_{col(1)}{}^T M))^T \circ \sqrt{1_{1\times 6}(M \circ M)})/2$, and yields $\hat{C}' \leftarrow (vec\hat{R}^T)\backslash M$. The final value is relatively insensitive to the value, e.g., using $\hat{C}'=1$ works well.

This direct factoring, as done by the present invention, gives a best-fit rotation rather than a rotation closest to the best-fit factor of the noisy matrix M, and thus outperforms the standard SVD plus orthonormalization process, particularly, as noise increases. At high noise levels, the orthonormal decomposition is substantially the correct rotation with p<0.01 levels of statistical significance for matrices of 2D projections generated with random rotations, k coefficients, and noise sources.

Motion Refinement

Due to the first-order nature of the formulation of the optical flow, for large motion, it may be desirable to recalculate the temporal variation (Y'), and the spatial variation X from a image region offset by the optical flow F implied in equation (2) when the optical flow is symmetric. The recalculation is done in optional flow determination step 628.

Then, the matrices R and C can be refined 652, 654 by the substituting $Y' \rightarrow Y'' \doteq Y' + (vec\hat{F})^T X$. While doing this, one can determined $\hat{R}$ and $\hat{C}$ from each other by:

$$\hat{R} \leftarrow \left(\underset{2\times n}{vec}(Y''/X) + \bar{B}\right) \Big/ ((C' \otimes I_3)D') \quad (5)$$

$$\hat{C} \leftarrow (Y'' + (vec(\bar{B}-RB))^T X) / (((I_k \otimes R)D)^{(2)T} X) \quad (6)$$

using the identity $A_{i\times j} \otimes B_{m\times n} = C \Leftrightarrow A \leftarrow (vec_j((vecB)\backslash vec_{mn} C^{(m)}))^T$.

Equation (6) is the first example of an estimator that constrains the optical flow of the sequence of images to be oriented in the appropriate sub-space, e.g., the flexion as expressed by the matrix C 207.

By reshaping and multiplicative canceling, three separate divisions, as used in the standard practice of equation (3), have been converted in equations (5–6) into a single division by a product, saving the least-squares operation for last, thereby minimizing the error in the information state.

The dividend and divisors of the so-structured estimators are called "evidence matrices." These are described in greater detail below with respect to incorporating uncertainty information, developing single-division, and subspace-constrained versions of equations (4) and (5).

Scaled Orthography

Equation (4) above and equation (7) below are scaled orthographic, with the first element of the matrix C 207 giving the change in scale. Equation (6) can be made scaled orthographic via a substitutions $k \rightarrow k+1$, $D \rightarrow D'$.

Oblique and Occluded Regions

On a image-by-image basis, backfacing and silhouette-edge regions can be discounted by adding information about surface normals to the model. The contribution of each flow window to X and Y can be weighed by $max(0, z)$, where z is the depth component of its associated unit normal. For occluded points, the translation vector $\hat{T}$ must be refined as well.

Propagating Image Uncertainties

Assuming Gaussian noise in the images, the uncertainty of an unconstrained optical flow (F=Y/X) is described by a full-covariance 2D normal probability distribution function with a posterior inverse covariance $\Sigma^{-1}=X$. As stated above, the division Y/X discards this uncertainty information. In contrast, the method according to the invention propagates this uncertainty information forward so that the information can interact with known invariants until the information state of the model is finally reduced to give the final shape, motion, and flexion.

Division with an Elliptical Error Norm

Generally, when solving problems of the form E=JK−L=0, one replaces the implicit spherical error norm $tr(E^T E)$ with an elliptical error norm $(vecE)^T \Sigma^{-1}(vecE)$ having a symmetric covariance $\Sigma$. The vecE enables arbitrary covariance constraints between all variables, even when the variables are in different columns of E. Setting the derivative of the matrix E to zero, the solution must satisfy $0=(vec(JK-L))^T Q$, where Q 504, a factor of $\Sigma^{-1}$, determines the error norm that the solution minimizes, i.e., $Q=I \Rightarrow$spherical error norm.

Because the uncertainty information specifies an elliptical error norm, $Q=\sqrt{\Sigma^{-}}$, i.e., the columns of Q 504 are the scaled eigenvectors of $\Sigma^{-1}$ such that $$Q=V\sqrt{\Lambda},\ QQ^T = V\Lambda V^T = \Sigma^{-1}\ \text{and}\ VV^T = V^T V = I.$$

The elliptical error norm Q 504 rotates the directions of the greatest and least uncertainty of the problem into axis-alignment, and scales each axis proportional to its certainty. The identity $(JK)=(I \otimes J)vecK = (K^T \otimes I_{rows(J)})vecJ$ yields solutions $$\hat{K} \leftarrow vec_{rows(K)}((Q^T(I_{cols(K)} \otimes J))\backslash Q^T vecL),$$

and $$\hat{J} \leftarrow vec_{rows(J)}((Q^T(K^T \otimes I_{rows(J)}))\backslash (Q^T vecL)).$$

Certainty—Weighted Estimators

Because $\Sigma^{-1}X$ is 2×2 block diagonal, Q 504 can be determined in step 612. The temporal gradient of the image information, warped into certainty-weighted data space by an uncertainty transform 658, is calculated as $Y''' \doteq Y''Q\Lambda^{-1}$ (covariance-weighted flow statistics). Removing the global translation 660 yields weighted and centered statistics 622. The uncertainty-propagating forms of constraint equations (4–6) determined in steps 650, 642, 654 are $$M \leftarrow \underset{6\times(k+1)}{vec} \left[ (Y''' + (vec\bar{B})^T Q) / ((D' \otimes I_2)Q) \right] \quad (7)$$

$$\hat{C} \leftarrow (Y''' + (vec(\bar{B}-RB))^T Q) / (((I_K \otimes R)D)^{(2)T} Q, \quad (8)$$

and $$\hat{R} \leftarrow \underset{2\times 3}{vec} \left[ (Y''' + (vec\bar{B})^T Q) / (((( C' \otimes I_3)D') \otimes I_2)Q \right], \quad (9)$$

respectively.

Consequently, as intended, all optical flow determinations are now performed in the sub-spaces of rotation and flexion. A similar, simpler form gives the translation vector $\hat{T}$.

Equations (7–9) give much better performance than the prior art estimators, and are numerically better behaved. Their numerical advantages can further be leveraged by making the deformations in D' unit length so that numerical accuracy is not concentrated in any one flexion.

Fast Approximation

At the risk of exaggerating certainties, one can substitute Q→X to obtain equation (6) and $$M \overset{=}{\leftarrow} \underset{6\times(k+1)}{vec} \left[ (vecY'' + Xvec\bar{B})^T / ((D' \otimes I_2)X \right.$$

$$\hat{R} \overset{=}{\leftarrow} \underset{2\times 3}{vec} \left[ (vecY'' + Xvec\bar{B})^T / (((( C' \otimes I_3)D') \otimes I_2)X) \right].$$

Bayesian Formulation

Residuals and Likelihoods

Given an optical flow $\hat{F} \leftarrow ((C'_\otimes R)D' - \bar{B}) \oplus T$, the unaccounted temporal intensity information is $H \doteq Y - (vec\hat{F})^T X$ intensity-levels times pixel-lengths. Working forward from the Gaussian uncertainty model of low-level optical flow, the tracking residue 604, or Mahalonobis distance determined during error calculation 605, is $\sqrt{HX^{-1}H^T}$ intensity-levels per image. This implies that the likelihood (residual & probability) 604 of the optical flow evidence, given the motion, $p(X,Y|R,C,T) = e^{-(HX^{-1}H^T + 2n \log 2\pi - \log |x|)/2}$. Each of the equations (8–9) yields the optimum of p in its subspace.

Priors and Maximum a Posterior Probabilities

Consider a Gaussian prior probability $p_C(C')$ on scaling and the flexion, with a mean of $\mu_{C'}$ and a covariance of $\Sigma_{C'}$. Because the log-posterior probability is a sum balancing log-likelihood against the log-prior probability, the maximum a posteriori estimator $$\hat{C}'_{MAP} \doteq \mathrm{argmax}_{C'} p\left( C|X, Y, R, T, \mu_{C'}, \sum_{C'} \right)$$

654 is constructed by concatenating the following underlined terms to the evidence matrices of the maximum likelihood:

$$\hat{C}'_{MAP} \leftarrow [Y''' + (vec(\bar{B} - RB))^T Q, \quad (10)$$

$$\underline{\mu_{C'} Q_{C'}} ] / \left[ ((I_{k+1} \otimes R)D')^{(2)T} Q, \underline{Q_{C'}} \right],$$

where $Q_{C'}$ are scaled eigenvectors of $$\sum_{C'}^{-1}$$

satisfying $$Q_c, Q_{C'}^T = \sum_{C'}^{-1}.$$

MAP estimators can similarly be constructed for translation and rotation.

Multi-Image/Multi-View Constraints

Multi-image and multi-view constraints are determined as follows. Choose any set of previously processed images and produce virtual images by warping the processed images into the pose of the image I using the motion and flexion as described above. Then, the multi-image motion/flexion estimators for the next image J are built by concatenating the evidence matrices while comparing each virtual image with image J. The matrices are already weighted by their certainties, so the result is a proper expectation instead of a mere average. Even though the tendency of the optical flow to drift has been reduced by the geometric constraints of the model, multi-image estimators can further stabilize the texture against the inherent drift. Evidence from multiple cameras can be combined in the flex estimator by similar concatenation.

Model Acquisition

Model Refinement

When rotation (652) and flexion (654) are determined for many images, the model D', including B, can be refined to better fit the object in the sequence of images as follows. Let $R_{0 \to t}$ and $C_{0 \to t}$ be the rotation and flexion taking image 0 into image t, and $N_{0 \leftarrow t} \doteq C_{0 \to t} \otimes R_{0 \to t} - C'_{0 \to t-1} \otimes R_{0 \to t-1}$. Let $F_{t-1 \to t}$ be the optical flow that takes image t-1 into image t, and let $T_{t-1 \to t}$ be the translational component of the optical flow. Then, equation (2) yields $D' = [\Downarrow_{t-1}^T N_{0 \to t}] \backslash [\Downarrow_{t-1}^T F_{t-1 \to t} - T_{t-1 \to t}]$, where $\Downarrow$ signifies vertical stacking.

If this equation is rewritten using the uncertainty information, then one obtains a solution for the model that minimizes tracking residuals for the motion:

$$\hat{D}' \leftarrow \underset{3(k+1)\times n}{vec} [[\prod_{t=1}^{T} Q_{t-1\to t}^{T}(I_n \otimes N_{0\to t})][\prod_{t=1}^{T} Q_{t-1\to t}^{T} vec(F_{t-1\to t} - T_{t-1\to t}^{T})]] \quad (10)$$

where Q and $\Lambda$ are those of equations (7–8). This model refinement 626 takes the output of one tracking run and produces a better model suitable for another run of tracking. One can determine the shape of the object directly from optical flow gradients by replacing $$Q_{t-1\to t}^{T} vec(F_{t-1\to t} - T_{t-1\to t}^{T})$$

with $$\Lambda_{t-1\to t}^{-1} Q_{t-1\to t}^{T} vec(Y_{t-1\to t} - (1_{1\times n} \otimes T_{t-1\to t}^{T})X_{t-1\to t}).$$

However, this shape can be sensitive to brightness constancy violations, e.g., specularities. It is possible to constrain equation (11) to retain the x, y coordinates of the original model and to solve only for depth and deformations by stacking heavily weighted rows with frontal-plane-only rotations.

Adding Detail

Model refinement 626 makes it possible to increase the level of detail of the model. New points can be interpolated, extrapolated, tracked, and refined to get corrected depths and deformations for all points.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

I claim:

1. A method for modeling a non-rigid three-dimensional object directly from a sequence of images, comprising:

representing a shape of the object as a matrix of 3D points, and a basis of possible deformations of the object as a matrix of displacements of the 3D points, the matrices of 3D points and displacements forming a model of the object;

determining evidence for an optical flow from image intensities in a local region near each 3D point; and factoring the evidence into 3D rotation, translation, and deformation coefficients of the model to track the object in the video.

2. The method of claim 1 wherein the evidence includes local spatial variation, temporal variation, and spatial gradients of image intensities in the local regions in each image of the sequence.

3. The method of claim 2 wherein the spatial variation at any point $$X \text{ is } \doteq \int_R g(x)^T g(x) d(x),$$

the temporal variation $$Y \text{ is } \doteq \int_R [I(x) - J(x)] g(x) d(x),$$

and the spatial gradients g(x) are $[\partial_x(I+J), \partial_y(I+J)]$ or $[\partial_x(J), \partial_y(J)]$, for consecutive images J and I in the video.

4. The method of claim 1 wherein an orthographic projection of the model onto each image of the video is expressed by $$P = R_{d\times 3}(B_{3\times n} + (C_{1\times k} \otimes I_3)D_{3k\times n}) \oplus T_{2\times 1},$$

where R is a rotation matrix, B is a shape matrix, I is an identity matrix, D is a deformation matrix, C is a flexion of all the deformations, and T a translation matrix.

5. The method of claim 4 wherein the matrix of displacements includes a matrix of shape to handle scaling of the object in the video.

6. The method of claim 1 wherein the rotation, translation, and deformation are determined with a minimal number of inner product and least-squares operations to minimize information loss, and all least-squares calculations utilize elliptical error norms derived from the evidence.

7. The method of claim 1 wherein the optical flow determined from the evidence for local regions in the sequence of images is constrained to be globally consistent with the model.

8. The method of claim 1 wherein the model is derived directly from a generic model and residuals obtained by using the generic model to track the object in video using the evidence, rotation, translation, and deformation.

* * * * *